3,047,446
CONVEYOR BELTING
Douglas Ronald Henson, Sutton Coldfield, England, assignor to Dunlop Rubber Company Limited, a British company
Filed May 25, 1960, Ser. No. 31,738
Claims priority, application Great Britain June 23, 1959
8 Claims. (Cl. 154—52.1)

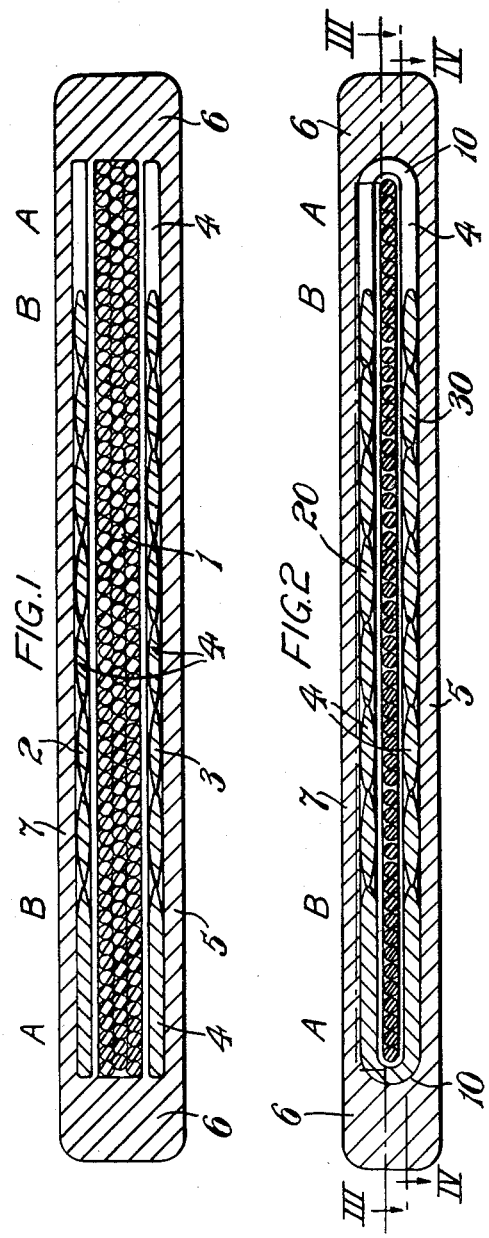

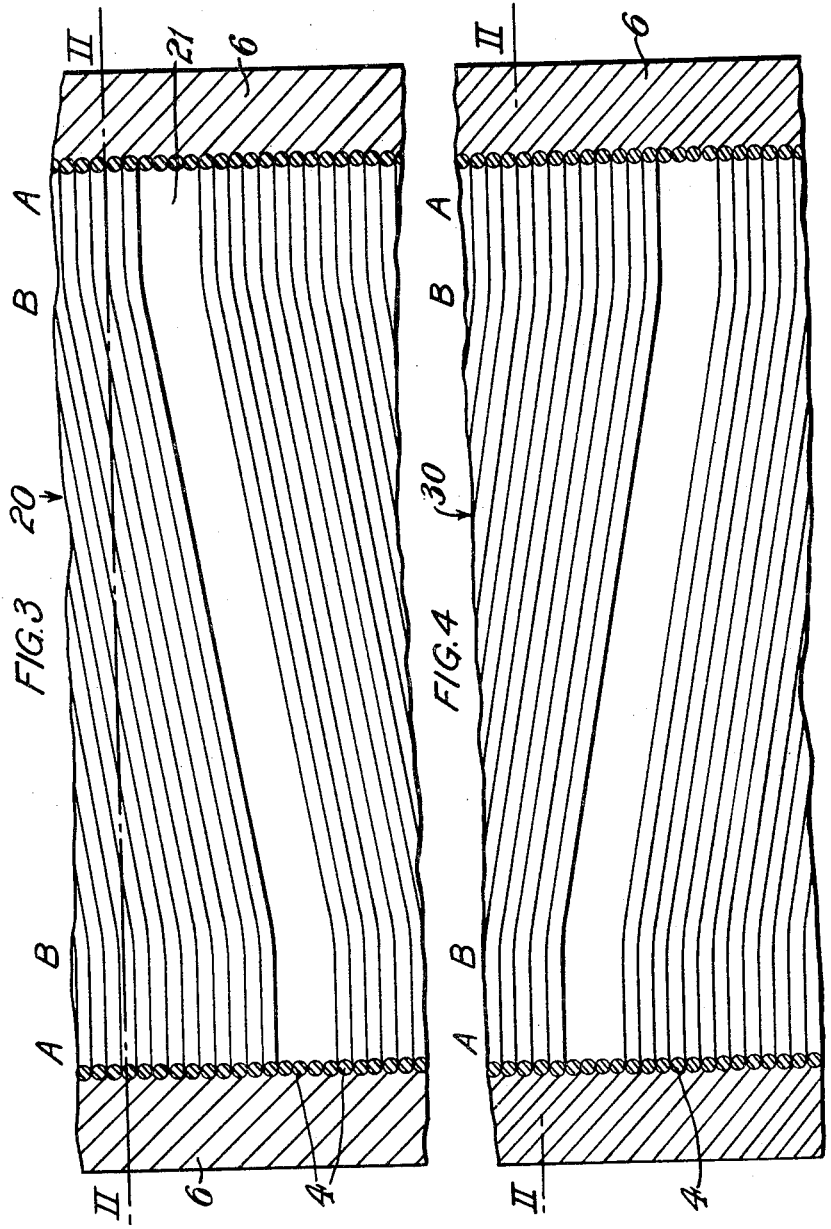

This invention relates to conveyor belting.

It is desirable, particularly in movable conveyor belt systems such as are used for example in coal mines, to provide the belts with considerable lateral stiffness in their edge regions so as to reduce the incidence of edge-turnover due to misalignment of the conveyor driving and supporting pulleys.

According to the present invention a conveyor belt includes in its carcass at least two stiffening plies of cords which extend substantially from side to side of the belt and lie at a greater angle to the longitudinal axis of the belt at its side regions than in its central region.

In this construction, the side regions of the belt are provided with the desirable lateral stiffness while the central region is less stiff to facilitate its troughing when in use.

The plies of the carcass are impregnated and coated with a moldable plastic material and the assembled plies, preferably with covering layers and edge strips of moldable plastic material, are consolidated by means of heat and pressure in the production of the conveyor belt.

The stiffness provided depends upon the angle of the cords to the longitudinal axis of the belt and increases as the angle becomes greater, being maximum when the cords are disposed perpendicularly thereto. The degree of stiffness is also dependent upon the distance between the two plies, increasing with increase of this distance, and also upon the extensibility of the cords, reduction in extensibility increasing the stiffness.

Preferably the angle of the cords in the stiffening plies changes gradually over an intermediate region of the belt on each side of its central region so as to avoid any sharp change in stiffness which could lead to a line of high stress in the belt due to hinging. The cords may be of steel, for example a cord spun from a plurality of fine steel wires or alternatively a single steel wire such as piano wire. Alternatively, textile cords may be used, either doubled or spun, or monofilament cords such as nylon monofilament. The choice of cords for any construction is dependent upon the degree of stiffening required and is associated in design with the angles and extensibility of the cords and the distance between the two stiffening plies thereof.

The cords of each stiffening ply are preferably loosely held together, to facilitate handling of the plies and their correct positioning in the carcass assembly, in the form of "weftless cord fabric," that is the type of cord fabric commonly used in the rubber industry for building pneumatic tires, including a weft of weak threads spaced at long intervals; the fabric is therefore only substantially weftless.

The invention will be described by way of example with reference to the accompanying drawings of conveyor belts for carrying granular or powdered materials over trough-shaped supports in which, FIGURE 1 is a section transversely of a conveyor belt having stiffening plies according to the invention, FIGURE 2 is a section transversely of an alternative conveyor belt wherein the stiffening plies are helically arranged, taken on lines II—II of FIG. 3 and FIG. 4, FIGURE 3 is a section on line III—III of FIG. 2 showing cords in an upper stiffening ply and FIG. 4 is a section on line IV—IV of FIG. 2 showing cords in a lower stiffening ply.

In FIG. 1 a belt of width 28 inches has a carcass comprising conventional reinforcement plies 1 of cotton duck of thickness ⅛ inch. Above and below this carcass are stiffening plies 2, 3 of "weftless cord fabric" in which nylon cords 4 extend from side to side of the carcass. In a side region A of width 4 inches from each edge of the cords lie at 90 degrees to the longitudinal axis of the belt and in a central region of width 18 inches they lie at 80 degrees to this axis, the cords 4 in the respective stiffening plies 2, 3 being biassed in opposite directions. In the intermediate regions B of width 1 inch between the side regions A and the centre region the angle of the cords gradually changes from 90 degrees to 80 degrees in a smooth curve.

In the production of the belt the stiffening ply 3 of weftless cord fabric is placed upon a lower cover layer 5 of polyvinyl chloride-based moldable plastic material, the fabric of the ply 3 being first applied at an edge region A then pulled sideways, that is, longitudinally of the cover layer, applied over the central region and after being pulled sideways in the opposite sense applied to the other edge region A. The reinforcement plies 1 impregnated with polyvinyl chloride-based plastic are then assembled in superposed relation and the stiffening ply 2 placed on the assembly in similar manner to the ply 3. Edge strips 6 of polyvinyl chloride-based plastic are next positioned over the cover layer 5 and a further cover layer 7 positioned over the upper stiffening ply 2 and the edge strips 6. The assembly is then consolidated by heating in a press.

In the conveyor belt shown in FIGS. 2, 3 and 4 similar parts and regions are designated by the same references as are employed in FIG. 1.

Stiffening plies 20, 30 are formed by a ribbon comprising a number of parallel cords 4, the ribbon being helically wound transversely around a reinforcement ply 1. In FIGS. 3 and 4 one edge 21 of the ribbon is shown without the component cords for clarity; the ribbon is sufficiently broad for one coil of the helix which is formed to adjoin adjacent coils while maintaining the desired angle, in this case of 80 degrees, between the cords 4 and the longitudinal axis of the belt. The ribbon is applied to the surfaces of the ply 1 in a similar manner to that in which the fabric of the plies 2 and 3 is placed in the assembly of the belt of FIG. 1 and the carcass of the belt shown in FIGS. 2, 3 and 4 has edges 10 in which substantially no raw or frayed fabric appears.

Having now described my invention, what I claim is:

1. A conveyor belt comprising a plane, flat, length of resilient material, a longitudinal reinforcement ply of cords in said resilient material, said ply extending from one edge margin of said length to the other and said cords extending longitudinally, and transverse stiffening plies of cords in said resilient material, said stiffening plies extending from one edge margin to the other, the cords lying transverse to the length of said belt, the cords lying in side-by-side relationship in each of said plies, the belt having a longitudinally extending central region wherein the cords of said transverse stiffening plies are inclined at an angle with respect to the longitudinal axis of the belt and longitudinally extending side regions between said central region and said margins, said cords of said transverse stiffening plies lying at a greater angle with respect to the longitudinal axis of the belt in the side regions than in the central region.

2. A conveyor belt as claimed in claim 1 wherein the stiffening plies are of weftless cord fabric.

3. A conveyor belt as claimed in claim 1 wherein two stiffening plies lie one at each face of the reinforcement ply and are embedded in flexible plastic material.

4. A conveyor belt as claimed in claim 3 wherein said transverse stiffening cords lie at right-angles to the longitudinal axis of the belt in the side regions thereof.

5. A conveyor belt as claimed in claim 1 wherein the cords in respective stiffening plies are biassed in opposite directions in the central region of the belt.

6. A conveyor belt as claimed in claim 5 wherein the cords in respective stiffening plies lie substantially at the same angle to the longitudinal axis of the belt in the central region of the belt.

7. A conveyor belt as claimed in claim 3 wherein the cords of said stiffening plies extend in a flattened helix around the reinforcement ply.

8. A conveyor belt as claimed in claim 1, said cords of said stiffening plies extending in a flattened helix around the reinforcement ply, being embedded in flexible plastic material and lying substantially at right angles to the longitudinal axis of the belt in the side regions thereof.

References Cited in the file of this patent

UNITED STATES PATENTS 2,930,425     Lugli et al. _____ Mar. 29, 1960

FOREIGN PATENTS 236,324     Great Britain _____ July 9, 1925
426,684     Great Britain _____ Apr. 8, 1935